May 1, 1951     C. A. LINDEMAN, JR     2,551,025
SWASH PLATE MECHANISM
Filed June 17, 1946
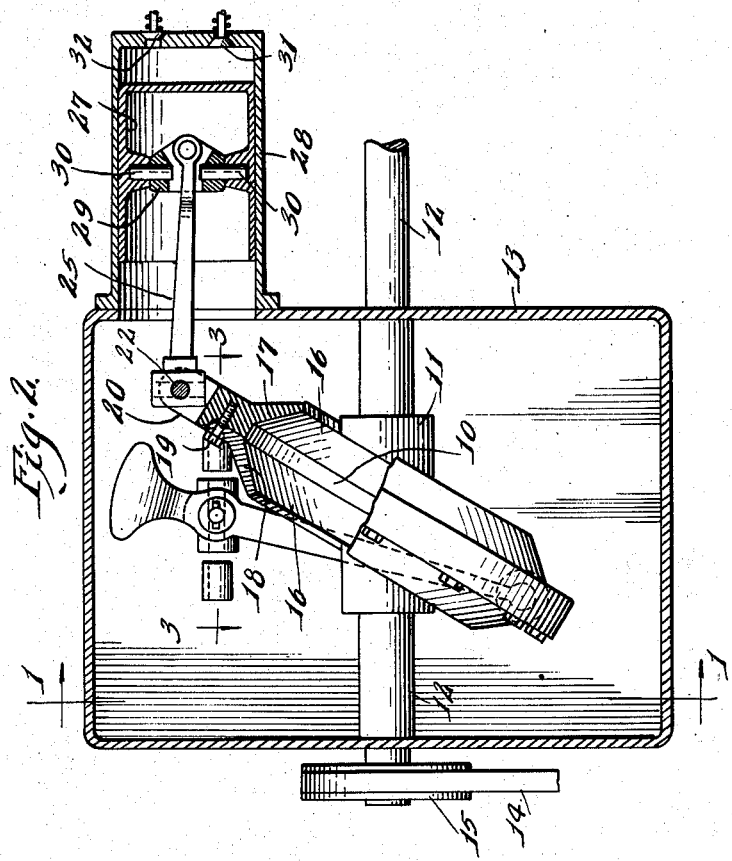
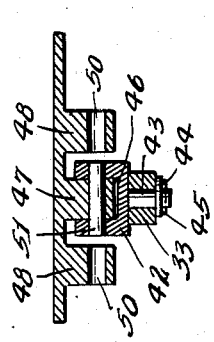
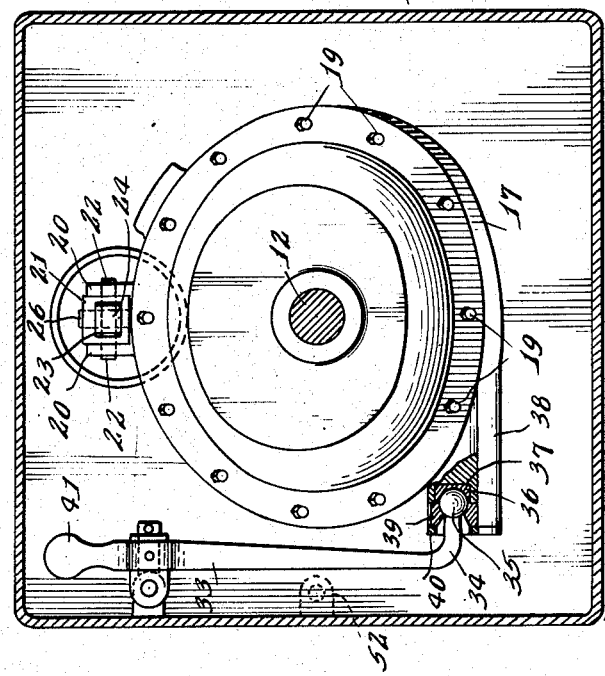
Inventor:-
Charles A. Lindeman Jr.
By: Kent W. Worrell
Attorney.

Patented May 1, 1951

2,551,025

UNITED STATES PATENT OFFICE 2,551,025

SWASH PLATE MECHANISM

Charles A. Lindeman, Jr., Maywood, Ill.

Application June 17, 1946, Serial No. 677,263

3 Claims. (Cl. 74—60)

This invention relates in general to a swash plate mechanism for converting rotary motion to reciprocating motion and also for converting reciprocating motion to rotary movement.

In utilizing the movement of a swash plate, it is necessary to provide means for limiting the movement of the swash plate casing with respect to the rotary member upon which it is mounted, but also to permit a limited universal movement of the swash plate casing, at the same time confining such movement to certain predetermined limits. The movement of the swash plate casing may also be varied with respect to the stroke of a pump or engine by changing the position of the casing restraining means to one side or the other of a central location.

An important object of the invention is to provide a swash plate mechanism having adjustable means for restraining the casing from rotation, but permitting a limited universal movement thereof.

A further object of the invention is to provide a swash plate mechanism comprising a casing having means for restraining and varying its cyclic movement as related to a piston or other connected member for imparting or producing reciprocating movement.

Other objects of the invention will appear in the specification and will be apparent from the accompanying drawings in which, Fig. 1 is an elevational view as taken on the line 1—1 of Fig. 2 of a swash plate mechanism in accordance with this invention with one of the connecting joints shown in section;

Fig. 2 is a side elevation of the structure shown in Fig. 1 with some of the parts in section; and Fig. 3 is a sectional detail taken on the line 3—3 of Fig. 2.

In the movement of the casing parts of a swash plate mechanism, there is a slight weaving or universal movement for which provision must be made in attaching any restraining or limiting mechanism thereto; otherwise the strain and friction is so great that the parts will bind unduly or will have large frictional loss or may even become broken. It is also found that by varying the connection of the limiting or restraining means for the swash plate casing, a considerable variation in stroke may be obtained which is valuable in the operation of a compressor which has a long power stroke and a short return stroke and also in a reciprocal engine which may be applied to the swash plate mechanism for operating it.

The present invention overcomes these objections by providing a universal connection from the swash plate casing to an engine or compressor crank pin, a piston, and also in providing universal limiting mechanism for controlling the movement and cycle of operation of the casing.

Referring now more particularly to the drawings, a swash plate 10 having a hub 11 is mounted on a shaft 12 within a confining casing 13. The shaft may be rotated by means of a belt 14 and a pulley 15 or any other suitable mechanism, or if movement is imparted to the shaft through the swash plate, power may be taken from the shaft by means of the pulley and a belt or similar driving means.

The swash plate is mounted at a fixed angle upon its hub 11 and preferably has angular sides 16 extending from an outer or central rim, the outer peripheries of which are enclosed by a casing having two parts 17 and 18, the latter secured to the former and clamping the swash plate between them by means of a number of fastening bolts 19.

Projecting from one side of the casing are parallel ears 20 in which a block 21 is mounted for rotation upon pivots 22. Within this block is an opening 23 for receiving a perforated end 24 of a piston rod 25 which is mounted upon a pivot pin 26 at right angles to the pivots 22, thus providing a limited universal joint.

The other end of the piston rod 25 may extend outwardly from the casing 13 and into a piston 27 of a cylinder 28 of an internal combustion engine or for a compressor. The piston rod is also connected to the piston by a limited universal joint comprising a piston block 29 pivoted on a cross shaft 30 and by means of a wrist pin 31 at right angles to the axis of the shaft 30 to which a divided or bifurcated end of the piston rod 25 is connected, extending on opposite sides of shaft 30.

If the cylinder 28 is for a compressor, it is commonly provided with inlet and outlet valves 32 and 32a. If this cylinder is for an internal combustion engine, it will be provided with inlet and outlet valves, a spark plug, a suitable fuel supply and exhaust means. Although a single cylinder and piston rod connections to the swash plate casing are shown, a plurality of such cylinders and connections may be located at various points with respect to the swash plate casing or a pair of opposite swash plate mechanisms may be located on the same shaft; if a two cylinder compressor, they may be at opposite sides thereof or at about 90° apart around the swash plate, and if a four cylinder compressor, they may be at 90° around the casing. In order to limit and follow the movement of the casing as the swash plate is rotated, a restraining arm 33 is provided at one side of the casing having a limited universal joint secured to a fixed point and a universal connection with the swash plate casing.

One end of the restraining arm has a bent extremity 34 with a bearing ball 35 at the extremity thereof engaged by an inner bearing 36 seated in a recess 37 of a projection 38 from the swash plate casing and by an outer bearing 39 held in place by a cap 40 extending over the outer bearing. The outer bearing 39 has a conical recess extending therefrom, allowing relative movement of the end 34 of the arm 33 through a considerable angle.

At the upper end of the arm 33 is a counterweight 41, and intermediate the ends of the arm but preferably adjacent the outer end thereof is a limited universal connection comprising a bearing block 42 secured at one side of the arm 33 by a bearing pin 43 extending through the arm with a washer 44 and a locking pin 45 in the outer end of the shaft. The bearing block has a recess 46 in its opposite or rear side adapted to embrace any one of a plurality of projections 47, 48 and 49 each having a transverse perforation 50 therethrough for receiving a connecting bearing pin 51 which extends through the opening and also through the sides of the bearing block 42 when one of the projections 47, 48 and 49 is seated in the recess 46.

The bearing pin 51 is at right angles to the bearing pin 43 to provide for a limited or angular movement of the arm 33 with respect to the swash plate casing. Instead of the projections 47, 48 and 49 being located at a line substantially tangent to the top of the swash plate casing, other similar projections as 52 may be located as low as the center line of the shaft 12 upon which the swash plate is mounted, or at various distances between these two positions. When the projections are higher or lower, there is too much friction between the parts resulting in the loss of power.

By locating one of the projections 47 substantially at the center line transversely of the swash plate as viewed in Fig. 2, it is found that the power and return stroke imparted to the piston 27 of a compressor are substantially of equal length. When the arm 33 is connected to one of the other projections 48 or 49, the power stroke imparted by the swash plate to the piston is correspondingly lengthened or shortened in duration. In this way the power cycle may be changed. For example, in one setting, the power stroke may extend for 200° or more of the circular movement of the shaft and the swash plate, leaving 160° or less for the return stroke. In a similar way, the other connection will produce a reversal of the timing of the cycle of operations.

With this construction, circular movement imparted to the swash plate may be transmitted as longitudinal or reciprocating movement to a piston of a compressor. Conversely, if reciprocating movement is imparted by an engine to the swash plate casing, rotary movement may then be imparted to the swash plate and the shaft to which it is connected. If there are a plurality of compressors or engines, the continuous movement and application of power is more apparent and the addition of a number of such pistons and power devices is within the contemplation of this invention.

In any application of power, the swash plate casing is connected by universal connections with the piston of the power devices and the swash plate casing is connected to the restraining arm by universal and limited universal connections which permit a weaving movement of the swash plate casing as the swash plate is rotated relatively therein but at the same time confining the swash plate casing substantially in the same location and against rotation with the swash plate.

Although the invention is thus described in detail, it should be regarded by way of exemplification rather than a limitation of the invention as various changes may be made in the construction, combination and arrangement of the parts without departing from the spirit and scope of the invention.

I claim:

1. In a swash plate mechanism, a rotatable swash plate, a casing enclosing the swash plate, reciprocable power means connected to the casing, a restraining arm having a ball joint connected to the lower edge of the casing and the lower end of the arm, means forming a pivotal connection for the upper portion of the arm having pivots spaced apart and at right angles to each other, and a plurality of fixed projections for engaging one of the pivots of said connection in different spaced apart locations relative to the center line of the swash plate to vary the duration of the power and return strokes of said power means depending upon the projection engaged.

2. In a swash plate mechanism, a rotatable swash plate, a casing enclosing the swash plate, reciprocable power means connected to the casing, a restraining arm having a ball joint connected to the lower edge of the casing and the lower end of the arm, means forming a pivotal connection for the upper portion of the arm having pivots spaced apart and at right angles to each other, and fixed projections each having a perforation for receiving one of said pivots, one projection being located at one side and centrally of the swash plate and other projections spaced at opposite sides of the central projection and relative to the swash plate to vary the relative durations of the power and return strokes of the power means depending upon the projection to which the arm is connected.

3. In a swash plate mechanism, a rotatable swash plate at a fixed inclination to its axis of rotation, a casing enclosing the swash plate, reciprocating power means having limited rectangularly pivoted universal joint connections with the casing, means comprising an arm pivotally connected to the casing and having a mounting with rectangular axes at right angles to each other for connecting it to a fixed support for restraining the casing against rotation, and means comprising a plurality of projections spaced relative to the swash plate to any one of which the mounting of the arm may be pivotally connected for correspondingly varying the power and return strokes of said reciprocating power means.

CHARLES A. LINDEMAN, Jr.

REFERENCES CITED

The following references are of record in the file of this patent:

UNITED STATES PATENTS

| Number | Name | Date |
| --- | --- | --- |
| 130,696 | Bremer | Aug. 20, 1872 |
| 1,867,385 | Schlenker | July 12, 1932 |
| 2,105,019 | Turner | Jan. 11, 1938 |
| 2,368,933 | Lindeman | Feb. 6, 1945 |